(No Model.)

J. R. ROWLANDS.
DRIVING MECHANISM FOR FAN BLOWERS.

No. 293,360. Patented Feb. 12, 1884.

Witnesses
Fred Hayner
Ed. L. Moran

Inventor
John R. Rowlands
by his Attorneys
Brown & Brown

UNITED STATES PATENT OFFICE.

JOHN R. ROWLANDS, OF NEW YORK, N. Y., ASSIGNOR, BY MESNE ASSIGNMENTS, TO THE J. G. HOFFMAN MANUFACTURING COMPANY, OF SAME PLACE.

DRIVING MECHANISM FOR FAN-BLOWERS.

SPECIFICATION forming part of Letters Patent No. 293,360, dated February 12, 1884.

Application filed June 15, 1883. (No model.)

*To all whom it may concern:*

Be it known that I, JOHN R. ROWLANDS, of the city and county of New York, in the State of New York, have invented a new and useful Improvement in Driving Mechanism for Fan-Blowers, of which the following is a specification.

My invention relates to driving mechanism which is capable of operation manually to impart a rapid rotary motion to fan-blowers of small size, such as are commonly used for blacksmith's forges. In such mechanism there is used a large pulley or fly wheel, from which a belt passes to the shaft of the blower, and which is rotated by hand; and this invention consists in novel combinations of parts and details of construction in the means employed to rotate the large pulley or fly wheel.

Figure 1:
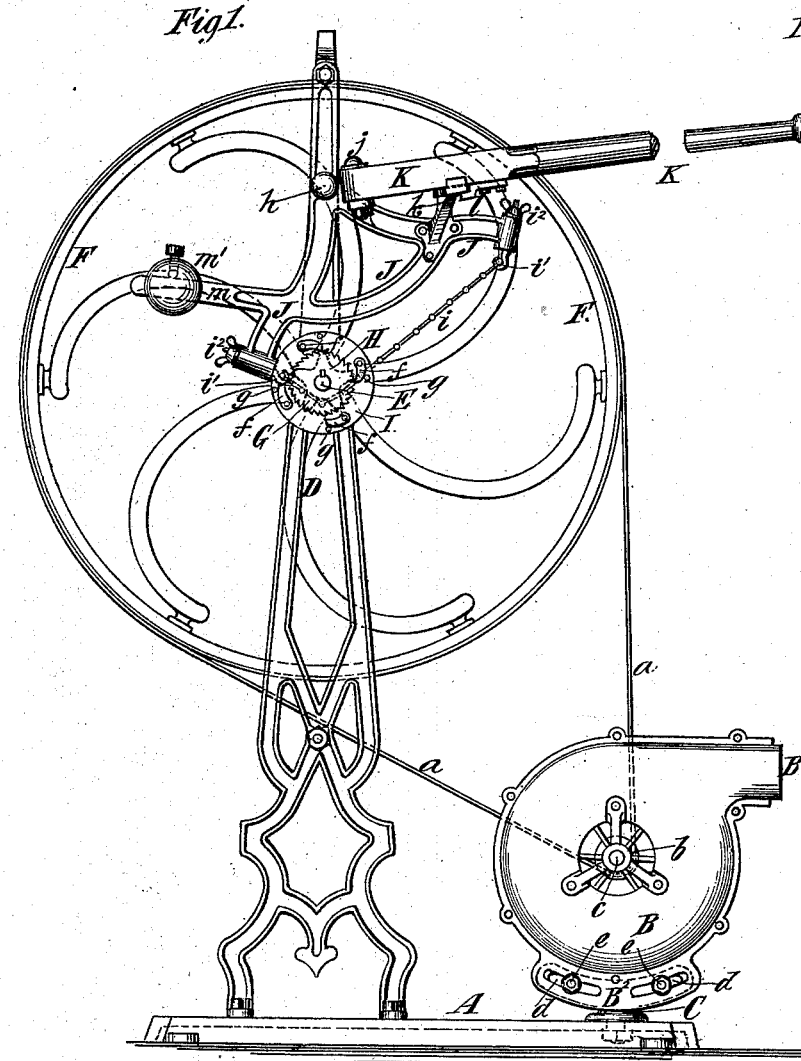
Figure 2:
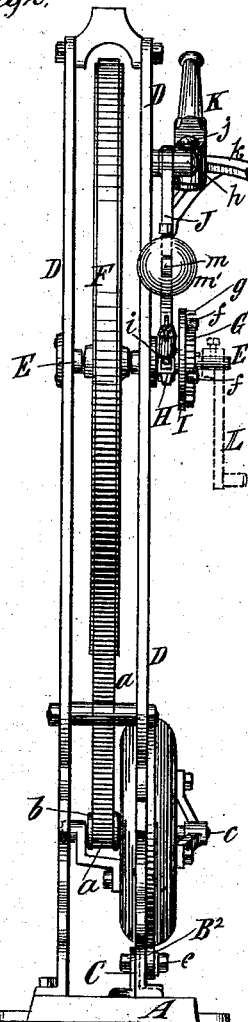
Figure 4:
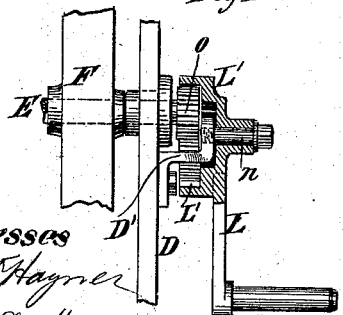
Figure 3:
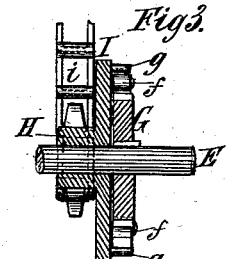

In the accompanying drawings, Figure 1 is a side elevation of a blower and driving mechanism therefor which embodies my invention. Fig. 2 is a front elevation thereof. Fig. 3 is a detail view upon a larger scale, and hereinafter described; and Fig. 4 is a detail view of devices for rotating the larger pulley or wheel by hand.

Similar letters of reference designate corresponding parts in all the figures.

A designates a base piece or plate, whereon both the blower and its driving mechanism are secured in this example of my invention.

B designates the blower or blower-case, from which the air escapes through the discharge nozzle or outlet B', and which is rotated by a belt, $a$, passing over a pulley, $b$, on the blower-shaft $c$.

C designates a foot piece or support, which is secured on the base A, and to the side of which the blower B is secured. The case of the blower is provided with a lug or projection, $B^2$, on its lower portion, in which are arc-shaped slots $d$, and the blower is secured to the support or foot C by bolts $e$, which pass through the said support or foot and through the slots $d$. When the bolts are loosened, the blower may be adjusted circumferentially, so as to present the nozzle B' in different directions, and after adjustment the blower may be secured in place by tightening the bolts $e$.

D designates standards erected on the basepiece A, and in which is journaled a shaft, E. Upon this shaft and between the standards is secured a large pulley, F, which may be of considerable weight, so as to serve as a flywheel, and from this pulley the belt $a$ is carried to the pulley on the shaft of the blower to drive it.

Upon the outer end of the shaft E is secured a ratchet-wheel, G, and fitting loosely on the shaft, inside the ratchet-wheel, are a sprocket or chain wheel, H, and a disk or flange, I, which are formed integral or rigidly connected together. The flange or disk I carries a number of pawls, $f$, which are adapted to engage with the ratchet-wheel G, and which impart motion to said wheel, and through it to the shaft E and pulley F, when the flange or disk is turned in one direction; but when turned in the other direction the pawls ride freely over the teeth of the wheel G. The flange I may be considered as a part of the chain-wheel H, as it always moves with it.

Upon the flange or disk I are pins $g$, which form stops to prevent the pawls from dropping too far away from the face of the ratchet-wheel G when they are below the same, and when the pawls are carried round above the wheel they drop into engagement with its teeth. A single pawl, held in engagement with the teeth of the ratchet-wheel by a spring, might be used; but where three or more pawls are used, one or more will always be in engagement with the wheel, by reason of its gravity, and when the pawls are carried backward over the teeth they make much less noise than they would if acted upon by springs. In lieu of the ratchet-wheel G and pawls, I may use any other form of clutch that will permit the wheel H to be turned backward independently of the shaft E.

J designates a sector-like frame, fulcrumed at $h$ to one of the standards D, and carrying a chain, $i$, which engages with the sprocket or chain wheel H. The two ends of the chain may be secured to the rocking frame J by means of eye or hook bolts $i'$ and nuts $i^2$, to afford provision for tightening the chain. The chain may be made like ordinary drive-chain, with open links, as shown in Fig. 3.

K designates the operating lever or bar, which is pivoted at j to the rocking frame J, and has a bearing on a rest or bracket, k, extending outward from the rocking frame. The lever K may be swung on its fulcrum or pivot j and over the bracket or bearing k toward and from the wheel, and this enables the smith to move readily to and from the fire without taking his hand from the operating-lever. Upon the under side of the lever is a clip or flange, l, which projects under the bracket or bearing k, and prevents the lever from being raised upward off the said bracket or bearing. This connection of the lever with the bracket or bearing permits the lever to be moved laterally as before described, but insures the rocking frame J moving with the lever K when the latter is raised. From the rocking frame J there projects an arm, m, upon which is an adjustable weight, m', whereby the rocking frame may be aided in its return as the lever K is moved upward. As the lever K is moved downward the pawls f engage with the teeth of the wheel G and rotate it and the pulley F, and during the upward movement of the lever the pawls ride freely over the wheel G, while the latter and the pulley F continue to rotate by momentum, and the blower is operated continuously.

If desired, one end of the chain i may be disconnected from the rocking frame J, and thus freed from the wheel H, and a crank, L, may then be applied to the end of the shaft E, as shown in Fig. 2, to rotate it continuously by hand.

In lieu of using a simple crank attached directly to the shaft E, I may employ the devices shown in Fig. 4 for accelerating the speed of the pulley F. I have there represented the crank L as formed upon or attached to an internal-gear wheel, L', which is journaled so as to rotate freely on a pin or stud, n, projecting from the bracket D', attached to the frame D. Upon the end of the shaft E is a spur-pinion, o, which gears with the internal-gear wheel, L'. The internal gear, L', is greater in pitch-diameter than the pinion o, and consequently as the crank L is rotated a quicker or accelerated rotation is imparted to the shaft E and pulley F.

What I claim as my invention, and desire to secure by Letters Patent, is—

1. The combination, with a driving wheel or pulley and its shaft, of a chain-wheel having a clutch-connection with said shaft which will permit the wheel to turn independently of the shaft in one direction only, a rocking frame and means for oscillating it, and a drive-chain carried by said rocking frame and gearing with said chain-wheel, substantially as specified.

2. The combination, with a driving wheel or pulley and its shaft, of a chain-wheel having a clutch-connection with said shaft which will permit the wheel to turn independently of the shaft in one direction only, a rocking frame and means for oscillating it, and a drive-chain having one or both ends detachably connected with said frame and gearing with said chain-wheel, whereby provision is afforded for detaching the chain and rotating the wheel or pulley by a hand-crank, substantially as specified.

3. The combination, with a driving wheel or pulley and its shaft, of a ratchet-wheel secured to the shaft, a flange or wheel loosely fitting on said shaft, and carrying a number of pawls adapted to engage with the said ratchet-wheel by gravity only, and means for rotating said loose flange or wheel alternately in opposite directions, substantially as specified.

4. The combination of the wheel or pulley F, the shaft E, the ratchet-wheel G, fast on said shaft, the chain-wheel H, loose on said shaft, and carrying pawls f, the rocking frame J and its drive-chain i, and means for oscillating said rocking frame, all substantially as specified.

5. The combination of the wheel or pulley F, the shaft E, the chain-wheel H, having a clutch-connection with said shaft, the rocking frame J, provided with the arm m and carrying the drive-chain i, and the weight m', all substantially as specified.

6. The combination, with a driving wheel or pulley and its shaft, of a chain-wheel having a clutch-connection with said shaft which will permit the wheel to turn independently of the shaft in one direction only, a rocking frame and a drive-chain connected therewith and engaging with said chain-wheel, an operating-lever fulcrumed at its inner end to said frame, and a bearing or bracket projecting from the frame, and upon which said operating-lever may be adjusted laterally, substantially as specified.

7. The combination, with the pulley F and its shaft E, of the pinion o on said shaft, and the crank L and its internal gear, L', mounted on a pivot independent of the shaft E and gearing into the pinion o, substantially as specified.

JOHN R. ROWLANDS.

Witnesses:
FREDK. HAYNES,
ED. L. MORAN.